United States Patent
Kaga

(10) Patent No.: US 10,608,302 B2
(45) Date of Patent: Mar. 31, 2020

(54) BATTERY PACK

(71) Applicant: Panasonic Intellectual Property Management Co., Ltd., Osaka (JP)

(72) Inventor: Yoshito Kaga, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 46 days.

(21) Appl. No.: 15/739,193

(22) PCT Filed: Oct. 14, 2016

(86) PCT No.: PCT/JP2016/004577
§ 371 (c)(1),
(2) Date: Dec. 22, 2017

(87) PCT Pub. No.: WO2017/081838
PCT Pub. Date: May 18, 2017

(65) Prior Publication Data
US 2019/0109356 A1    Apr. 11, 2019

(30) Foreign Application Priority Data
Nov. 12, 2015    (JP) .................................. 2015-221919

(51) Int. Cl.
| | | |
|---|---|---|
| H01M 10/6554 | (2014.01) | |
| H01M 2/10 | (2006.01) | |
| H01M 2/20 | (2006.01) | |
| H01M 10/613 | (2014.01) | |
| H01M 10/625 | (2014.01) | |
| H01M 10/643 | (2014.01) | |
| H01M 10/6235 | (2014.01) | |

(52) U.S. Cl.
CPC ......... *H01M 10/6554* (2015.04); *H01M 2/10* (2013.01); *H01M 2/1077* (2013.01); *H01M 2/20* (2013.01); *H01M 2/206* (2013.01); *H01M 10/613* (2015.04); *H01M 10/625* (2015.04); *H01M 10/6235* (2015.04); *H01M 10/643* (2015.04); *H01M 2220/20* (2013.01)

(58) Field of Classification Search
None
See application file for complete search history.

(56) References Cited

U.S. PATENT DOCUMENTS

2012/0231309 A1* 9/2012 Itoi ..................... H01M 2/1077
429/99

FOREIGN PATENT DOCUMENTS

| | | |
|---|---|---|
| JP | 2012-028244 | 2/2012 |
| JP | 4923314 B | 4/2012 |

(Continued)

OTHER PUBLICATIONS

International Search Report of PCT application No. PCT/JP2016/004577 dated Nov. 22, 2016.

*Primary Examiner* — Daniel S Gatewood
(74) *Attorney, Agent, or Firm* — McDermott Will & Emery LLP

(57) ABSTRACT

A battery pack includes: a cell group including a plurality of cylindrical cells that are arranged in a manner of log pile in contact with each other; and a metal frame that extends along the periphery of the cell group and surrounds the cell group. The cells located at the corners of the cell group that has a substantially rectangular shape when viewed from an end surface side in the axial direction of the cells, are in contact with the metal frame.

8 Claims, 4 Drawing Sheets

(56) References Cited

FOREIGN PATENT DOCUMENTS

| JP | 2013-004468 | 1/2013 | | |
|---|---|---|---|---|
| JP | 2014-197452 | 10/2014 | | |
| JP | 2014197452 A | * 10/2014 | .......... | H01M 2/1077 |

* cited by examiner

BATTERY PACK

This application is a U.S. national stage application of the PCT international application No. PCT/JP2016/004577 filed on Oct. 14, 2016, which claims the benefit of foreign priority of Japanese patent application No. 2015-221919 filed on Nov. 12, 2015, the contents all of which are incorporated herein by reference.

TECHNICAL FIELD

The present disclosure relates to a battery pack.

BACKGROUND ART

Conventionally, Patent Literature 1 discloses a battery pack in which a plurality of cylindrical cells are arranged in a manner of log pile and potting resin portions are filled into clearances between outer peripheral surfaces of the cells. In this battery pack, the heat transferred from the cylindrical cells is dispersed via the potting resin portions. Therefore, a heat chain in the battery pack can be prevented.

CITATION LIST

Patent Literature

PTL 1: Unexamined Japanese Patent Publication No. 2012-28244

SUMMARY OF THE INVENTION

When a plurality of cylindrical cells are arranged in a manner of log pile in contact with each other as in the battery pack described in Patent Literature 1, the clearances between the outer peripheral surfaces of the cells can be minimized, and the energy density of the battery pack can be increased.

However, the number of cells adjacent to a cell that is located at each of the corners of the outer periphery of the cell group formed in such a structure is smaller than the number of cells adjacent to another cell located at a part other than the corners. Therefore, when a cell located at a corner abnormally generates heat, the number of heat transfer paths from the cell is relatively small, and hence the temperatures of its adjacent cells also can become abnormally high to cause a heat chain.

In order to address the above-mentioned problems, a battery pack of the present disclosure includes: a cell group including a plurality of cylindrical cells that are arranged in a manner of log pile in contact with each other or close to each other; and a metal frame that extends along the periphery of the cell group and surrounds the cell group. The cells located at the corners of the cell group that has a substantially rectangular shape when viewed from an end surface side in the axial direction of the cells are in contact with the metal frame.

In the battery pack of the present disclosure, the metal frame is in contact with the cells located at the corners of the cell group, and hence, when such a cell abnormally generates heat, the heat is transferred from the cell to the metal frame. Therefore, the accident can be suppressed in which the temperature of a cell adjacent to the cell becomes abnormally high. In the battery pack of the present disclosure, as a result, the energy density is increased, and a heat chain due to a cell located at a corner of the cell group and a cell adjacent to this cell can be further effectively suppressed.

DESCRIPTION OF EMBODIMENT(S)

Hereinafter, one exemplary embodiment of the present disclosure is described with reference to the accompanying drawings. In this description, specific shapes, materials, numerical values, and directions are examples for facilitating the understanding of the present invention, and can be appropriately changed in accordance with the application, objective, or specification. When a plurality of exemplary embodiments and modified examples are included in the following description, it is originally assumed to appropriately combine and use feature portions of them.

Figure 1:
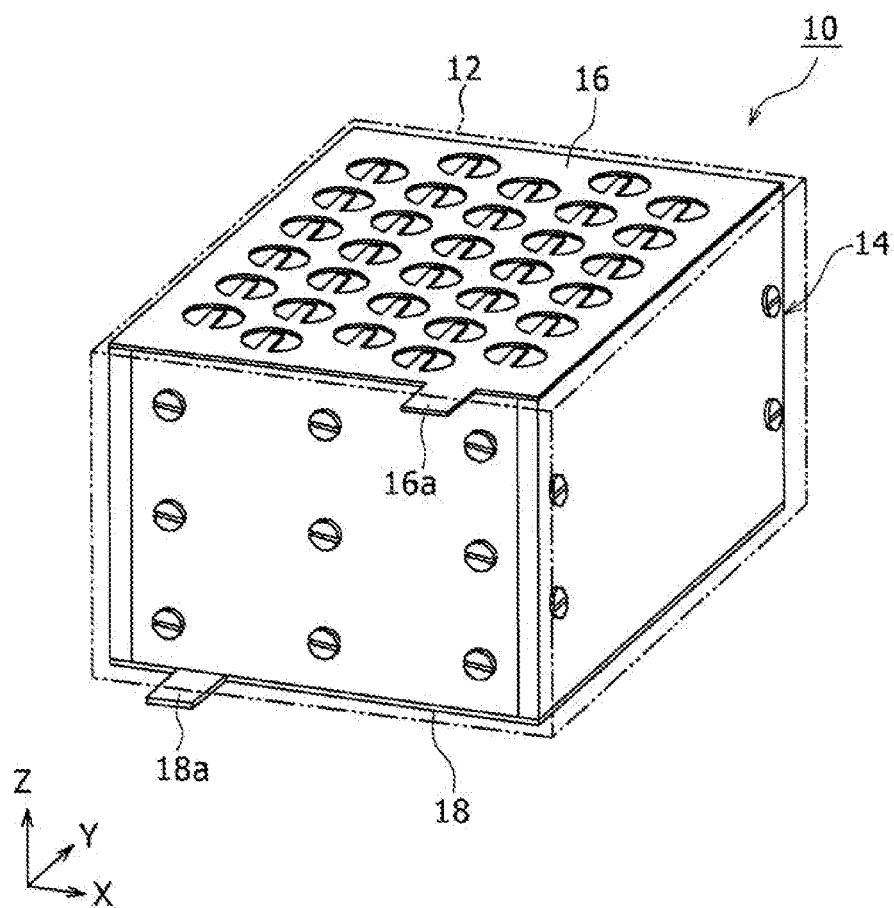
FIG. 1 is a perspective view showing a battery pack in accordance with one exemplary embodiment.
Figure 2:
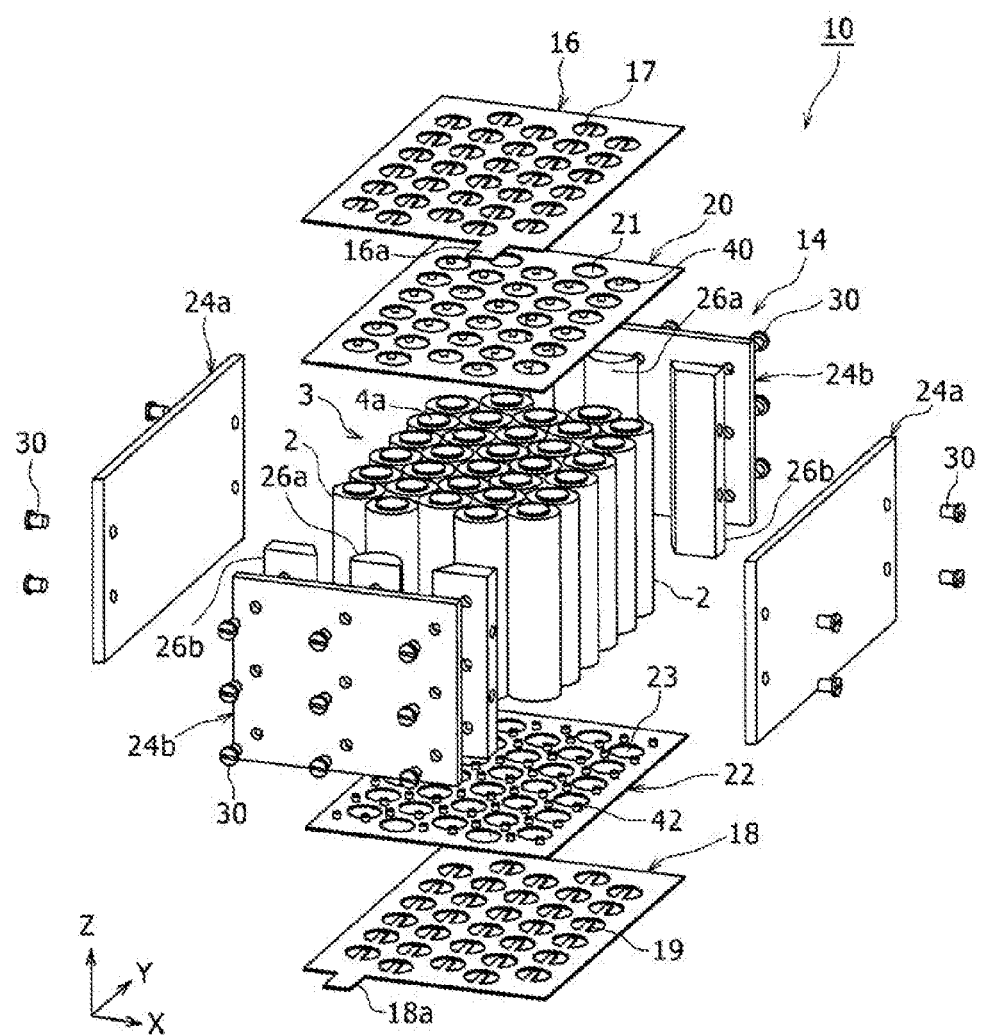
FIG. 2 is an exploded perspective view of the battery pack shown in FIG. 1.
Figure 3:
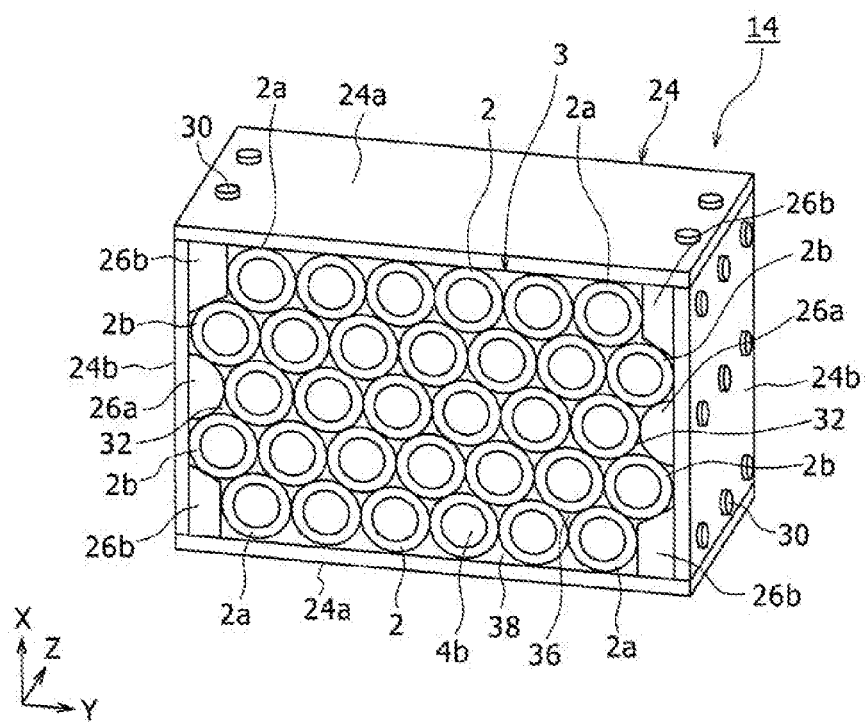
FIG. 3 is a perspective view showing a cell group and metal frame included in the battery pack.
Figure 4:
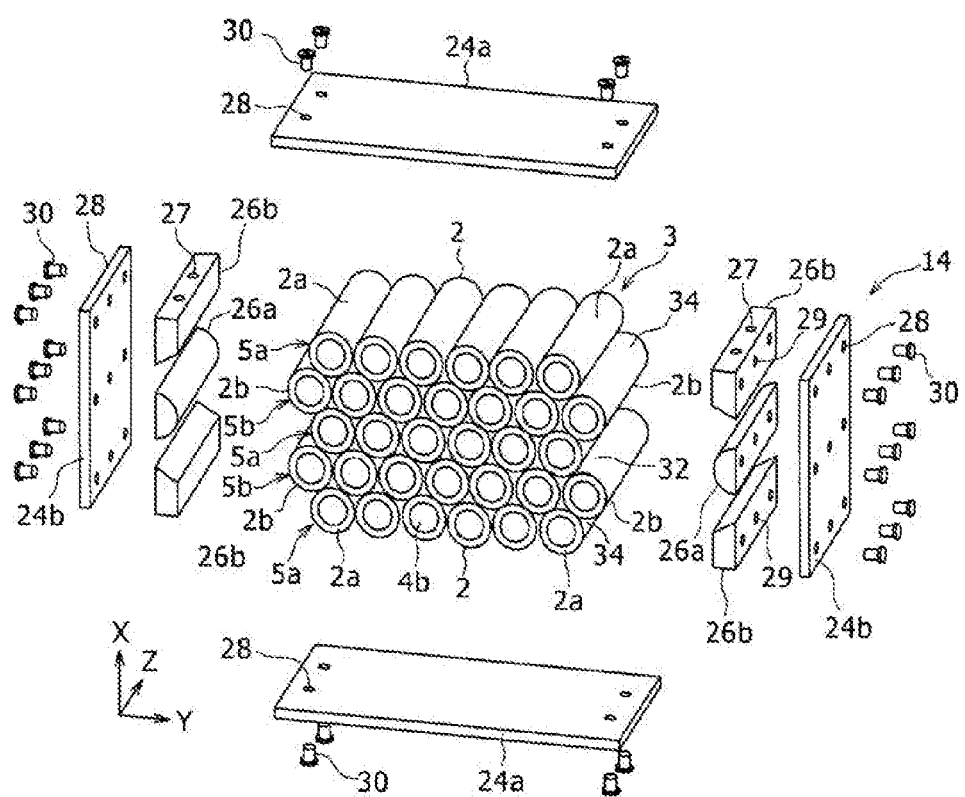
FIG. 4 is a perspective view showing the metal frame shown in FIG. 3 in the exploded state.

FIG. 1 is a perspective view showing battery pack 10 in accordance with one exemplary embodiment. FIG. 2 is an exploded perspective view of battery pack 10 shown in FIG. 1. FIG. 3 is a perspective view showing cell group 3 and metal frame 14 included in battery pack 10. FIG. 4 is a perspective view showing metal frame 14 shown in FIG. 3 in the exploded state. In FIG. 1 to FIG. 4, three directions orthogonal to each other are denoted by arrows X, Y, and Z.

Battery pack 10 can be used as a power source of an electric tool, an electric assist bicycle, an electric motorcycle, a hybrid automobile, and an electric automobile, for example. Battery pack 10 can be used while being accommodated in case-shaped exterior body 12 shown by chain double-dashed lines in FIG. 1. Exterior body 12 can be configured of a bottomed casing having an opening upper part, and a lid for blocking the opening in this casing. Preferably, the casing and lid are made of plastic, for example.

As shown in FIG. 1 and FIG. 2, battery pack 10 includes: cell group 3 formed by aligning and assembling a plurality of cylindrical cells 2 in contact with each other; and metal frame 14 disposed so as to surround the periphery of cell group 3. Battery pack 10 can include: positive electrode current collector 16 electrically connected to positive electrode terminals 4a of cells 2 constituting cell group 3; negative electrode current collector 18 electrically connected to negative electrode terminals 4b (FIG. 3) of cells 2 constituting cell group 3; positive-side insulating plate 20 interposed between cell group 3 and positive electrode current collector 16; and negative-side insulating plate 22 interposed between cell group 3 and negative electrode current collector 18.

Each cell 2 in the present exemplary embodiment is a chargeable/dischargeable cylindrical secondary cell, and a lithium-ion cell is employed suitably, for example. However, cell 2 may be another secondary cell such as a nickel-metal-hydride cell, or a nickel-cadmium cell. Each cell 2 includes positive electrode terminal 4a on one end surface in the axial direction (Z direction) of the cylinder as shown in FIG. 2, and includes negative electrode terminal 4b on the other end surface in the axial direction as shown in FIG. 3 and FIG. 4. In the present exemplary embodiment, cells 2 constituting cell group 3 are arranged so that positive electrode terminals 4a face in the same direction.

Cell group 3 is formed by arranging a plurality of cells 2 in a manner of log pile (or a heaped bale structure, or zigzag pattern) in contact with each other. As shown in FIG. 4, in the present exemplary embodiment, three first cell columns 5a each having six cells 2 aligned in the Y direction and two second cell columns 5b each having seven cells 2 aligned in the Y direction are alternately arranged in the X direction. Therefore, cell group 3 of the present exemplary embodiment includes 32 cells 2.

The number of cells 2 constituting cell group 3 is not limited to the above-mentioned number, but can be appropriately changed in accordance with the capacity, size, or application of battery pack 1. In other words, cell group 3 just requires that first cell columns each having n (here, n is an integer of 1 or more) aligned cells 2 and second cell columns each having n+1 aligned cells 2 are alternately arranged in parallel in the X direction. Furthermore, the number of first cell columns may be equal to that of second cell columns, or the number of second cell columns may be one larger than that of first cell columns Cell group 3 is configured so as to form one group having a substantially rectangular outer periphery when the whole cell group is viewed from an end surface side in the axial direction (Z direction) of cells 2. Cells 2a and 2b are located at four corners of cell group 3 having a substantially rectangular shape. Cells 2a are the cells located at opposite ends in the Y direction (arrangement direction), of cells 2 constituting first cell columns 5a located on the opposite end sides in the X direction in cell group 3. Cells 2b are the cells located at opposite ends in the Y direction, of cells 2 constituting second cell columns 5b located at second columns from the opposite ends in the X direction in cell group 3.

As shown in FIG. 3, metal frame 14 extends along the periphery of cell group 3 and is disposed so as to surround cell group 3. Metal frame 14 in the present exemplary embodiment is formed as a metal frame that has a rectangular shape such as an oblong shape when viewed from the Z direction. As the material of metal frame 14, for example, a metal such as aluminum or an aluminum alloy is suitably employed.

Metal frame 14 includes metal wall portion 24 surrounding the periphery of cell group 3, and metal poles 26a and 26b projected integrally with side surfaces of metal wall portion 24 that face cell group 3. Specifically, metal wall portion 24 includes a pair of metal plates 24a facing each other in the X direction, and a pair of metal plates 24b facing each other in the Y direction. Metal plates 24a and 24b are interconnected by inserting, from the outside of metal frame 14, screws 30 into through holes 28 formed in metal plates 24a and 24b, and fastening them to female screw portions 27 in metal poles 26b.

The present exemplary embodiment has described the example in which metal wall portion 24 constituting metal frame 14 is configured of a plurality of metal plates 24a and 24b, but metal wall portion 24 is not limited to this structure. Metal wall portion 24 may be formed of one metal member. For example, frame-shaped metal wall portion 24 may be formed by bending one long metal plate, or may be integrally molded by aluminum die-casting or the like.

The inner wall surfaces of the pair of metal plates 24a, of metal wall portion 24 constituting metal frame 14, are in contact with the outer peripheral surfaces of cells 2 constituting first cell columns 5a located on the opposite end sides in the X direction, of first and second cell columns 5a and 5b included in cell group 3. Here, "inner wall surfaces" means the side wall surfaces, on the cell group 3 side, of metal wall portion 24 and metal poles 26a and 26b that constitute metal frame 14. The same is true for the following description.

It is preferable that the width in the Z direction of each of metal plates 24a and 24b constituting metal frame 14 is set equivalent to the length of the outer peripheral surfaces of cells 2 in the axial direction. Here, "equivalent" means not only the case of complete matching but also the case that the width is slightly shorter or longer. By setting the width of each of metal plates 24a and 24b in this manner, metal plates 24a and 24b can come into contact with the outer peripheral surfaces over substantially the whole length in the axial direction, and hence heat transfer from cells 2 to metal frame 14 can be sufficiently performed. When metal frame 14 is in contact with the outer peripheral surfaces of cells 2 located on the outer periphery of cell group 3, however, the width in the Z direction of each of metal plates 24a and 24b may be shorter than the length of the outer peripheral surfaces of cells 2 in the axial direction. That is because, even if abnormal heat generation occurs in cells 2, the heat is radiated to metal frame 14 to suppress the heat chain to other cells 2.

In metal frame 14 in the present exemplary embodiment, metal poles 26a and 26b are integrally attached to the inner wall surfaces of the pair of metal plates 24b facing each other in the Y direction. Specifically, as shown in FIG. 4, female screw portions 29 are formed in metal poles 26a and 26b, and metal poles 26a and 26b are fastened and fixed by fastening, into female screw portions 29, screws 30 inserted into through holes 28 formed in metal plates 24b.

As shown in FIG. 3, each of metal poles 26a and 26b has a substantially semi-circular or trapezoidal cross section shown when it is cut along the X-Y plane. In more detail, in battery pack 10 of the present exemplary embodiment, metal pole 26a attached to the center position of each of the pair of metal plates 24b in the X direction has a substantially semi-circular cross section. Metal poles 26b attached to the opposite ends of each of the pair of metal plates 24b in the X direction have a trapezoidal cross section. Preferably, the length of metal poles 26a and 26b in the Z direction is equivalent to the length of the outer peripheral surfaces of cells 2 in the axial direction, similarly to the case of metal plates 24a and 24b.

Metal pole 26a having a substantially semi-circular cross section is disposed so as to fit in recessed spaces 32. Spaces 32 are defined by cells 2 at the opposite ends in the Y direction of first cell column 5a located in the center in the X direction, and cells 2 at the opposite ends in the Y direction of adjacent second cell columns 5b on the opposite sides of first cell column 5a in the X direction. Thus, the inner wall surface of metal pole 26a is in contact with the outer peripheral surfaces of three cells 2 existing around metal pole 26a.

Each metal pole 26b having a trapezoidal cross section has a function of connecting metal plate 24a to metal plate 24b by fastening screws 30 to female screw portions 27 and 29 as discussed above. Metal poles 26b are disposed so as to fit in spaces 34 formed at respective corners of cell group 3. Spaces 34 are defined by cells 2a located at the opposite ends in the Y direction of first cell column 5a and cells 2b located at the opposite ends in the Y direction of second cell column 5b adjacent to this first cell column 5a. Thus, of the inner wall surface of each trapezoidal metal pole 26b, the inner wall surface along the X direction is in contact with the outer peripheral surface of cell 2a located at the corner of cell group 3, and the inner wall surface inclined with respect to the X direction is in contact with the outer peripheral surface of cell 2b located at the corner of cell group 3. Furthermore, the outer peripheral surfaces of cells 2a located at the corners of cell group 3 are in contact with the inner wall surfaces of the pair of metal plate 24a, and the outer peripheral surfaces of cells 2b located at the corners of cell group 3 are in contact with the inner wall surfaces of the pair of metal plate 24b.

An example has been described in which metal pole 26a fitting in each space 32 has a substantially semi-circular cross section, but the present disclosure is not limited to this. Metal pole 26a may have a trapezoidal cross section allowing the inner wall surface of metal pole 26a to be in contact with three cells 2 located around it. An example has been described in which metal pole 26b fitting in space 34 formed at each corner of cell group 3 has a trapezoidal cross section, but the present disclosure is not limited to this. Metal pole 26b may have another cross section such as a semi-circular or quarter-circular cross section as long as the inner wall surface of metal pole 26b is in contact with two (or three) cells 2 located around it.

As discussed above, in battery pack 10 of the present exemplary embodiment, the outer peripheral surface of cell 2a located at each corner of cell group 3 is in contact with metal frame 14 at two portions on metal plate 24a and metal pole 26b. The outer peripheral surface of cell 2b located at each corner of cell group 3 is in contact with metal frame 14 at three portions on metal plate 24b, metal pole 26a, and metal pole 26b. In battery pack 10, thus, each of cells 2a and 2b located at each corner of cell group 3 constituting battery pack 10 has at least two heat transfer paths to metal frame 14. The outer peripheral surface of each cell 2 is generally covered with an insulating coating such as a heat shrinkable tube, but the insulating coating is not required when cells 2 are interconnected in parallel.

In the case having no metal frame 14, the number of cells 2 that are around and in contact with each of cells 2a and 2b located at each corner of cell group 3 is three. In other words, each of cells 2a and 2b has heat transfer paths less than those of another cell 2 that is in contact with at least four cells 2. Therefore, if cells 2a and 2b abnormally generate heat due to an internal short circuit or the like, the amount of heat transferred to cells 2 around them may increase to ignite cells 2 (spreading fire).

In battery pack 10 of the present exemplary embodiment, conversely, metal frame 14 is in contact with cells 2a and 2b located at the corners of cell group 3. Therefore, when cells 2a and 2b have abnormally generated heat, the heat is also transferred from cells 2a and 2b to metal frame 14 and hence abnormal increase in temperature of cells 2 adjacent to them can be suppressed. In battery pack 10 of the present exemplary embodiment, therefore, the fire spreading of cells 2a and 2b located at the corners of cell group 3 and the fire spreading of cells 2 adjacent to them can be more effectively suppressed while the energy density is increased FIG. 1 and FIG. 2 are referred to again. Positive electrode current collector 16 is configured of a metal plate such as an aluminum plate or copper plate, and includes connection leads 17 that are formed in narrow shapes by punching their peripheries. Connection leads 17 are arranged in a staggered (or zigzag) manner in response to the arrangement of cells 2 constituting cell group 3. Connection leads 17 in positive electrode current collector 16 are electrically connected to positive electrode terminals 4a of cells 2 in cell group 3 via circular openings 21 in positive-side insulating plate 20 by ultrasonic welding or the like. Positive electrode current collector 16 also includes positive electrode tab 16a projecting in a rectangular shape from a part of the outer rim.

As shown in FIG. 1, positive electrode tab 16a extends out of exterior body 12 when battery pack 10 is accommodated in exterior body 12.

Negative electrode current collector 18 is formed of a metal plate such as an aluminum plate or copper plate, and includes connection leads 19 that are formed in narrow shapes by punching their peripheries. Connection leads 19 are arranged in a staggered manner in response to the arrangement of cells 2 constituting cell group 3. Connection leads 19 in negative electrode current collector 18 are electrically connected to negative electrode terminals 4b (FIG. 3) of cells 2 in cell group 3 via circular openings 23 in negative-side insulating plate 22 by ultrasonic welding or the like. Negative electrode current collector 18 also includes negative electrode tab 18a projecting in a rectangular shape from a part of the outer rim. As shown in FIG. 1, negative electrode tab 18a extends out of exterior body 12 when battery pack 10 is accommodated in exterior body 12.

Each of positive-side insulating plate 20 and negative-side insulating plate 22 is made of plastic. As discussed above, positive-side insulating plate 20 includes 32 circular openings 21 in a staggered (or zigzag) manner, and negative-side insulating plate 22 includes 32 circular openings 23 in a staggered (or zigzag) manner, in response to the arrangement of cells 2 included in cell group 3.

Pin 40 is projected on the periphery of each of openings 21 in positive-side insulating plate 20. Pin 42 is projected on the periphery of each of openings 23 in positive-side insulating plate 22. Pins 40 and 42 have a function of positioning cells 2, by being inserted into substantially triangular clearances 36 (FIG. 3) that are formed between the outer peripheral surfaces of cells 2 aligned and arranged in a manner of log pile (or a heaped bale structure) in cell group 3, or by being inserted into substantially triangular clearances 38 that are formed between the outer peripheral surfaces and metal plates 24a and 24b. In this case, even any one of pins 40 and 42 has an effect of positioning cells 2.

Furthermore, preferably, the rectangular outer periphery of positive-side insulating plate 20 is interposed between positive electrode current collector 16 and metal frame 14, and the rectangular outer periphery of negative-side insulating plate 22 is interposed between negative electrode current collector 18 and metal frame 14. Thus, positive electrode current collector 16 and negative electrode current collector 18 can be electrically insulated from metal frame 14.

As discussed above, cells 2 included in battery pack 10 are interconnected in series via positive electrode current collector 16 and negative electrode current collector 18 that are electrically connected to cells 2. Charge to cells 2 and discharge from cells 2 can be performed via positive electrode tab 16a and negative electrode tab 18a that extend out of exterior body 12.

In battery pack 10 of the present exemplary embodiment, as discussed above, metal frame 14 is in contact with cells 2a and 2b located at the corners of cell group 3. Therefore, when cells 2a and 2b have abnormally generated heat, the heat is also transferred from cells 2a and 2b to metal frame 14 and hence abnormal increase in temperature of cells 2 adjacent to them can be suppressed. In battery pack 10 of the present exemplary embodiment, therefore, the fire spreading of cells 2a and 2b located at the corners of cell group 3 and the fire spreading of cells 2 adjacent to them can be more effectively suppressed while the energy density is increased.

In battery pack 10 of the present exemplary embodiment, metal wall portion 24 and metal poles 26a and 26b that constitute a part of metal frame 14 come into contact with cells 2 located in the outer periphery of cell group 3 except the corners thereof. Therefore, the heat transfer to metal frame 14 from cells 2 located in the outer periphery of cell group 3 becomes sufficient, and hence the fire spreading between cells 2 can be more effectively suppressed than the case having no metal frame 14.

The battery pack of the present disclosure is not limited to the above-mentioned exemplary embodiment and its modified example. Various modifications or improvements are allowed in the items described in a scope of claims of the present application and in its equivalent scope.

For example, the example has been described in which cells 2 constituting cell group 3 are arranged in a manner of log pile (or a heaped bale structure) so that the outer peripheries of cells 2 are in contact with each other, but the present disclosure is not limited to this. Cell group 3 may be formed, by arranging cells 2 in a manner of log pile (or a heaped bale structure) in a mutually close state so as to form clearances of 1 mm or less between cells 2, for example. The arrangement state in which such clearances are formed between cells 2 can be accurately kept by pins 40 and 42 formed in positive-side insulating plate 20 and negative-side insulating plate 22.

In the case that cell group 3 is thus configured by forming clearances between cells 2, it is preferable that a resin material is filled into the clearances between cells 2 by potting, for example. Thus, the heat conductivity between cells 2 is improved by filling the clearances with a resin material of a heat conductivity higher than that of the air layer, and the heat chain can be further effectively suppressed.

Furthermore, the example has been described in which metal plates 24b and metal poles 26a and 26b that constitute metal frame 14 are separate members, but they may be formed integrally by die-casting or the like.

The invention claimed is:

1. A battery pack comprising:
   a cell group including a plurality of cylindrical cells arranged in a manner of log pile in contact with each other or close to each other; and
   a metal frame extending along a periphery of the cell group and surrounding the cell group,
   wherein the cells located at corners of the cell group, of the plurality of cells, are in contact with the metal frame, the cell group having a substantially rectangular shape when viewed from an end surface side in an axial direction of the plurality of cells, and
   wherein the metal frame includes:
      a metal wall portion surrounding the periphery of the cell group; and
      a metal pole projected integrally with a side surface of the metal wall portion, the side surface facing the cell group, and each of the cells located at the corners of the cell group is in contact with the metal wall portion and the metal pole.

2. The battery pack according to claim 1, wherein an inner wall surface of the metal wall portion is also in contact with a cell located at an outer periphery of the cell group except the corners of the cell group.

3. The battery pack according to claim 1, wherein the metal pole is fastened to the metal wall portion by a screw.

4. The battery pack according to claim 1, wherein the cell group is configured by alternately disposing a first cell column having n aligned cells, of the plurality of cells, and a second cell column having n+1 aligned cells, of the plurality of cells, in parallel in a direction orthogonal to a cell alignment direction, the n being an integer of 1 or more, and
   the metal pole is disposed so as to fit in a space defined by:
      a cell located at an end in the cell alignment direction of the first cell column; and
      a cell located at an end in the cell alignment direction of the second cell column adjacent to the first cell column.

5. The battery pack according to claim 4, wherein the metal pole disposed so as to fit in the space has a semi-circular or trapezoidal cross section.

6. The battery pack according to claim 1, wherein the metal wall portion includes a plurality of metal plates, and
   the plurality of metal plates are coupled to each other by a screw fastened to a female screw portion, the female screw portion being formed in the metal pole corresponding to each of the corners of the cell group.

7. The battery pack according to claim 1,
   wherein each of the plurality of cells includes a positive electrode terminal on a first end surface, and includes a negative electrode terminal on a second end surface, and
   each of the plurality of cells included in the cell group is disposed so that the positive electrode terminal faces in a same direction, and
   the battery pack further comprises:
      a positive electrode current collector electrically coupled to the positive electrode terminal of each of the plurality of cells;
      a negative electrode current collector electrically coupled to the negative electrode terminal of each of the plurality of cells; and
   an insulating plate interposed between each of the positive electrode current collector and the negative electrode current collector and the plurality of cells.

8. The battery pack according to claim 7, wherein the cell group, the metal frame, the positive electrode current collector, the negative electrode current collector, and the insulating plate are accommodated in a case-shaped exterior body.

* * * * *